United States Patent
Tsujino et al.

[11] Patent Number: 6,034,843
[45] Date of Patent: Mar. 7, 2000

[54] ACTUATOR ARM ASSEMBLY AND WIRING APARATUS USED IN A DISK STORAGE SYSTEM FOR WIRING VOICE COIL WIRES TO A FLEX CABLE

[75] Inventors: Hitoshi Tsujino, Fujisawa; Mutsuro Ohta, Yokohama, both of Japan; David W. Albrecht, San Jose, Calif.

[73] Assignee: International Business Machines Corporation, Armonk, N.Y.

[21] Appl. No.: 09/102,973

[22] Filed: Jun. 22, 1998

[30] Foreign Application Priority Data

Sep. 24, 1997 [JP] Japan .................................. 9-258006

[51] Int. Cl.⁷ ...................................................... G11B 5/54
[52] U.S. Cl. .............................................................. 360/106
[58] Field of Search .................................... 360/104–106, 360/108, 97.01, 98.01

[56] References Cited

U.S. PATENT DOCUMENTS

| | | | |
|---|---|---|---|
| 5,323,133 | 6/1994 | Heath et al. | 335/222 |
| 5,627,702 | 5/1997 | Kelemen et al. | 360/106 |
| 5,699,211 | 12/1997 | Magnusson et al. | 360/104 |
| 5,734,528 | 3/1998 | Jabbari et al. | 360/106 |
| 5,796,557 | 8/1998 | Bagnell et al. | 360/105 |
| 5,805,388 | 9/1998 | Engwall | 360/106 |
| 5,898,537 | 4/1999 | Oizumi et al. | 360/97.01 |
| 5,901,008 | 5/1999 | Nayak et al. | 360/78.02 |
| 5,907,452 | 5/1999 | Kan | 360/97.01 |

FOREIGN PATENT DOCUMENTS

| | | |
|---|---|---|
| 64-63227 | 3/1989 | Japan . |
| 2-166678 | 6/1990 | Japan . |

*Primary Examiner*—Jefferson Evans
*Attorney, Agent, or Firm*—Noreen A. Krall

[57] ABSTRACT

The present invention provides a stacked type actuator arm assembly equipped with a structure for easily fixing lead wires between a coil and a flexible cable. A stacked type actuator arm assembly that is used in a magnetic disk storage is equipped at the coil support portion of a coil support spacer with a small hole through which lead wires and are inserted. Since the spacer is stamped from a flat sheet, a structure for holding the lead wires cannot be freely formed as in a die casting method, but formation of the small hole according to the present invention is easy. During manufacturing, after the lead wires and have been inserted through the small hole, if they are processed in the following fabrication step, there is no possibility that force will be applied to the boundary portion between a coil and the lead wire extending from a wire of the coil which would peel a wire of the coil off. In addition, in the magnetic disk storage being operated, there is no possibility that the lead wires will move and then touch other components.

21 Claims, 6 Drawing Sheets

FIG. 1

(Prior Art)

ACTUATOR ARM ASSEMBLY AND WIRING APARATUS USED IN A DISK STORAGE SYSTEM FOR WIRING VOICE COIL WIRES TO A FLEX CABLE

BACKGROUND OF THE INVENTION

1. Field of the Invention

The present invention relates to a wiring route structure for an actuator arm assembly that is used in a disk storage such as a magnetic disk storage (also called a hard-disk drive). More specifically, the invention relates to an actuator arm assembly and a disk storage equipped with a wiring route structure for fixing a lead wire between the coil of a voice coil motor and a flexible cable.

2. Description of Related Art

Figure 1:
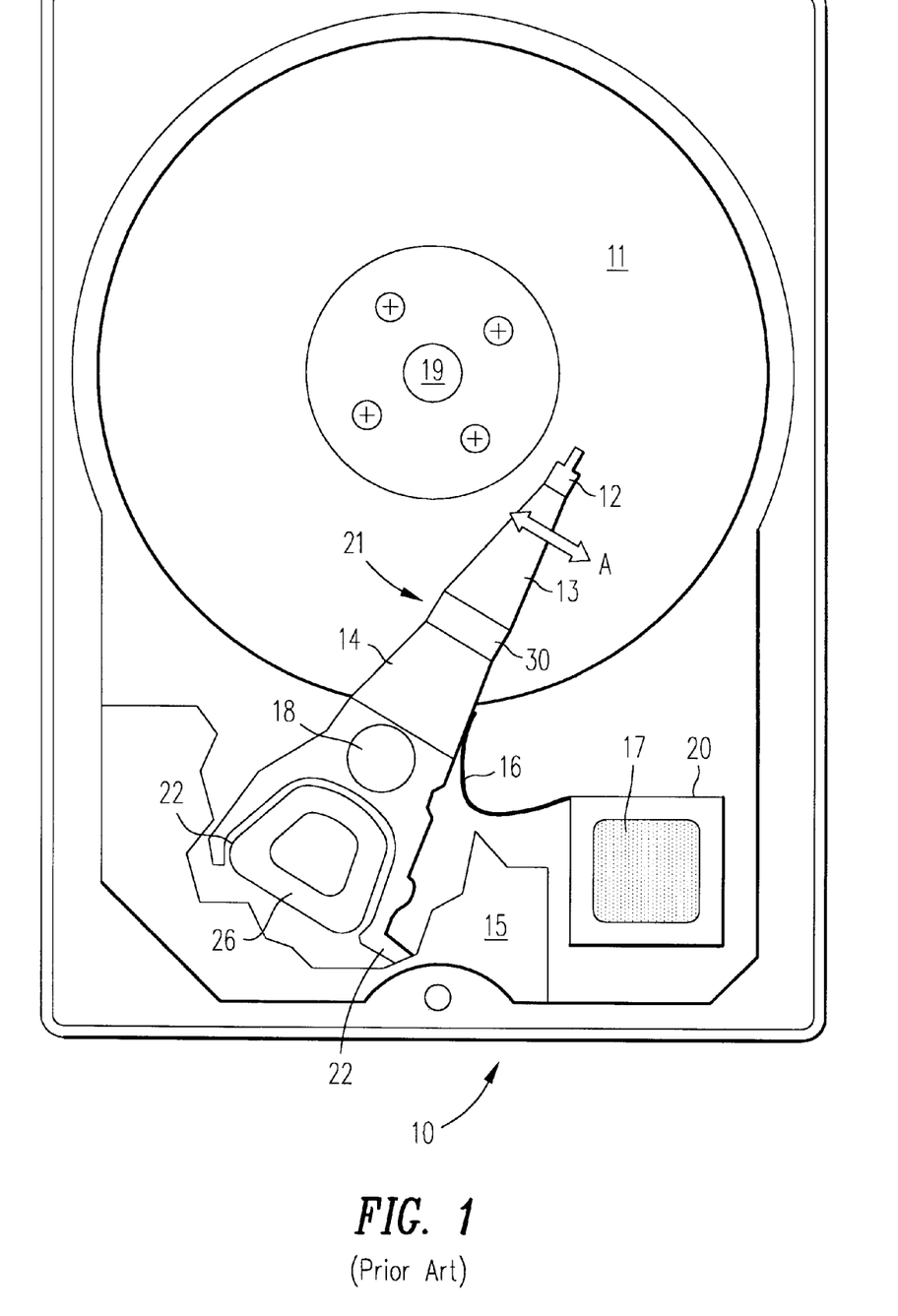
FIG. 1 is a plan view of a conventional magnetic disk storage.

FIG. 1 is a plan view of a conventional magnetic disk storage (hard-disk drive) 10. A plurality of magnetic disks 11 are stacked at regular intervals, and each magnetic disk 11 is fitted on a spindle 19 through the center hole of the disk and is spun at a constant speed. The magnetic disk 11 uses both sides thereof as storage areas. An actuator arm assembly 21 (hereinafter referred to as a "comb type actuator arm assembly") includes a comb type carriage 14 and head/suspension assemblies 13. To the point end 12 of the head/suspension assembly 13, a slider (not shown) with a magnetic head is attached so as to face the corresponding magnetic disk 11, while the rear end swage portion 30 is joined to the arm portion of the comb type carriage 14 by swaging. A portion of the comb type carriage 14 is formed as a coil support portion 22, and a coil 26 is fixed to the inner side of the coil support portion 22 with an adhesive agent. A voice coil motor portion 15 has permanent magnets interiorly and the coil 26 is held in the magnetic field present between the magnets. The lead wires extending from the coil 26 and the lead wires extending from the magnetic heads respectively are connected to a control unit 17 through a flexible cable 16 and a circuit board 20. The control unit 17 causes a controlled current to flow through the coil 26, thereby rotating the actuator arm assembly 21 on a pivot shaft 18. The rotation of the actuator arm assembly 21 positions the magnetic head over a desired track on the magnetic disk 11.

Figure 2:
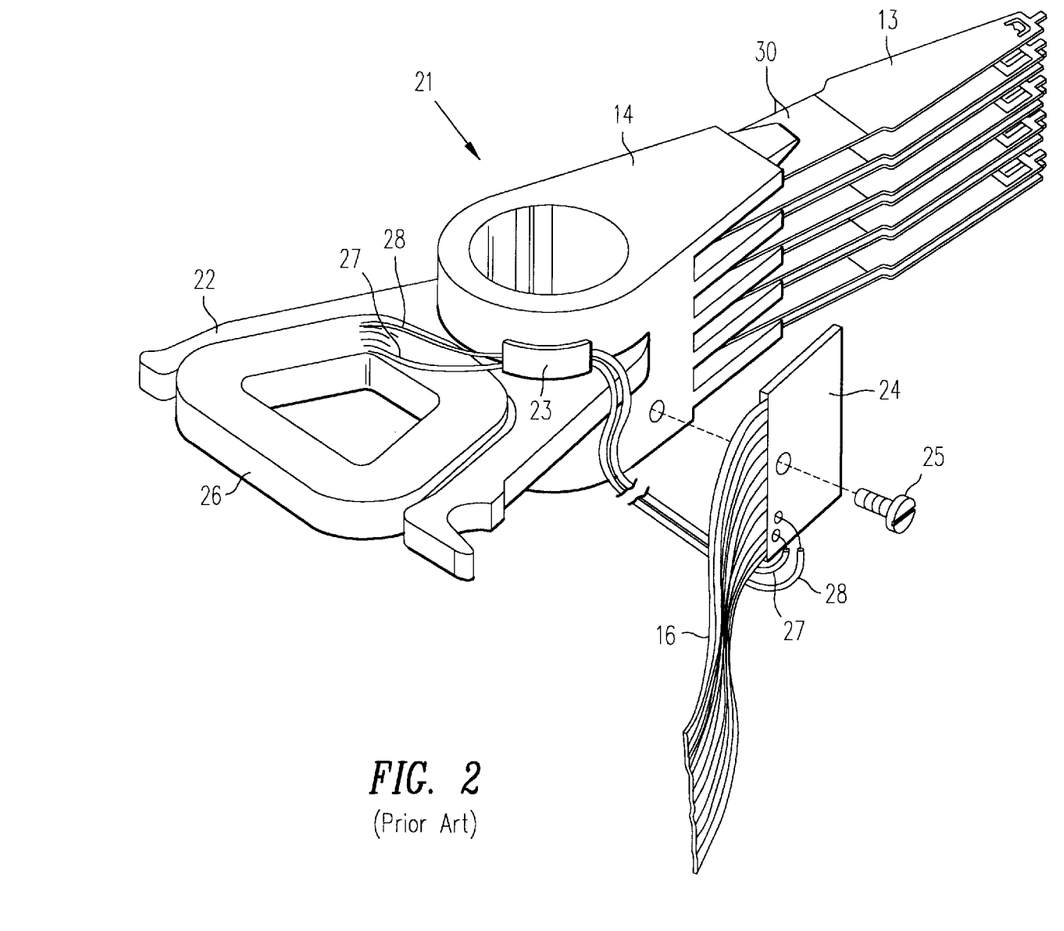
FIG. 2 is a perspective view of a conventional comb type actuator arm assembly.
Figure 3:
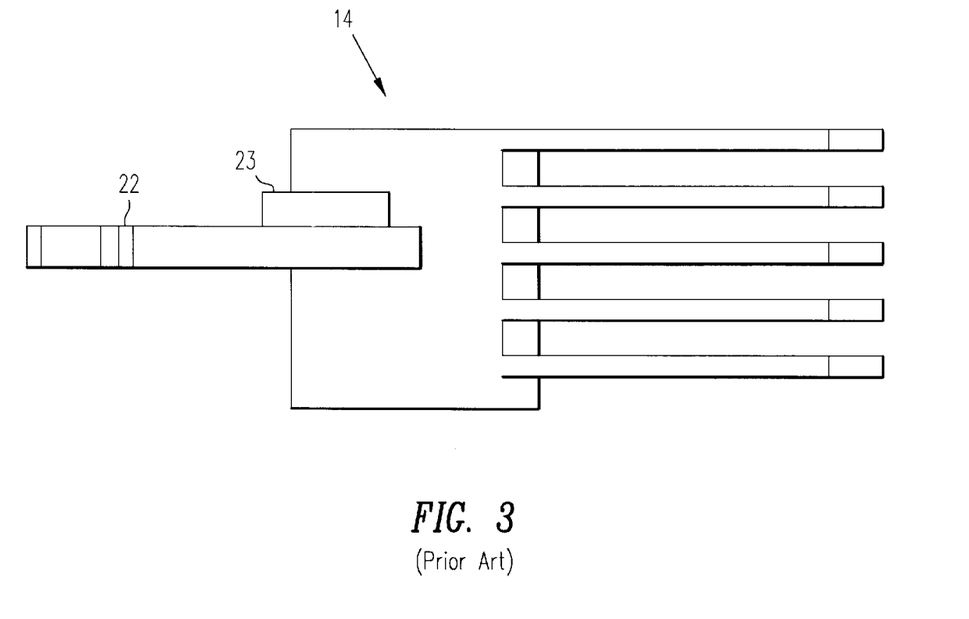
FIG. 3 is a side view of the comb type carriage shown in FIG. 2.

FIG. 2 is a perspective view of the comb type actuator arm assembly 21, and FIG. 3 is a side view of the comb type carriage 14 constituting a portion of the actuator arm assembly 21. Two lead wires 27 and 28 extend from the start end and terminal end of the coil 26 and are connected to the flexible cable 16. A portion of the coil support portion 22 is provided with a lead wire holder 23, which is formed to provide a groove at a wiring route of the lead wires 27 and 28 for inserting and fixing the lead wires covered with insulating tubes. The lead wires 27 and 28 are inserted into the groove formed by the lead wire holder 23 and are fixed to the coil support portion 22 with an adhesive agent. The primary reason why the lead wires 27 and 28 are fixed to the coil support portion is to prevent force from being applied to the lead wires 27 and 28 during the fabrication process, and thereby causing the wire of the coil 26 to separate from the coil 26 or coil support portion 22. Another reason is to allow for accurately wiring the lead wires 27 and 28 in a limited space along predetermined wiring route. Still another reason the lead wires 27 and 28 are fixed is for preventing the lead wires 27 and 28 from giving rise to an insulation defect by moving during operation of the actuator arm assembly 21 and touching the inner constituent components of the magnetic disk storage, or from having influence on the motion characteristic of the actuator arm assembly 21. The point ends of the lead wires 27 and 28 fixed with the lead wire holder 23 are electrically connected on a cable connecting board 24 to the flexible cable 16. The flexible cable connecting board 24 is fixed to the comb type carriage 14 by a screw 25.

The comb type carriage 14 shown in FIG. 3 is integrally molded by aluminum die casting. In the molding of the comb type carriage 14 by aluminum die casting, the configuration of the lead wire holder 23 can be easily selected, so it is not limited to the configuration shown in FIG. 2 but may be formed into other configurations such as a groove. Therefore, in the comb type actuator arm assembly, the lead wire fixing means between the coil 26 and the flexible cable 16 is obtainable comparatively easily.

However, a further reduction in the width of the magnetic disk storage has been pursued in recent years, so there has arisen a need to narrow the spacing between stacked magnetic disks even further. In the aforementioned comb type actuator arm assembly 21, the swaged portion 30 joining the head/suspension assemblies 13 and the comb type carriage 14 together becomes one obstacle in shortening the spacing between magnetic disks stacked, because the swaged portion occupies space in an up-and-down direction. On the other hand, an actuator arm assemblies using no comb type carriage (hereinafter referred to as a "stacked type actuator arm assembly") is becoming adopted. In the stacked type actuator arm assembly, each head/suspension assembly is integrally formed from the head-attached portion 12 to the pivot-shaft inserting portion, and these head/suspension assemblies are stacked on the pivot shaft 18 with spacers between them, so the stacked type actuator requires no swaged portion provided in the comb type actuator arm assembly and is suitable for thinning the magnetic disk storage.

In the stacked type actuator arm assembly, at least one of a plurality of spacers is equipped with a coil support portion. However, since the spacer is formed by pressing, it is not easy to form a lead wire holder, such as the one formed in the comb type carriage formed by aluminum die casting, in the coil support portion of the spacer. In addition, in a miniaturized magnetic disk storage there is not enough space around the periphery along the route for wiring the lead wires, so there is a need to wire the lead wires accurately along a predetermined route and keep them held on the predetermined route even during operation.

Accordingly, it can be seen there is a need to provide a stacked type actuator assembly equipped with a structure for easily fixing lead wires between a coil and a flexible cable.

SUMMARY OF THE INVENTION

To overcome the shortcomings of the prior art described above, it is an object of the present invention to provide a stacked type actuator arm assembly equipped with a structure for easily fixing lead wires between a coil and a flexible cable.

It is another object of the present invention is to provide a disk storage mounted with a stacked type actuator arm assembly and equipped with a structure for easily fixing lead wires between a coil and a flexible cable.

Briefly stated, the principle of the present invention resides in that in a stacked actuator arm assembly, the fixation of lead wires extending from a coil is obtained by a small hole formed in a spacer. Furthermore, it resides in that the lead wires inserted through the small hole are interposed between a circumferential portion of the spacer and a connection board of a flexible cable and are fixed at two places. In the stacked type actuator arm assembly, one or more head/suspension assemblies and one or more spacers are stacked with one another and fitted on a pivot shaft. At least one spacer of the spacers is equipped with a coil support portion for holding a coil. One head/suspension assembly is formed from a thin sheet and supports a head at the point end thereof, and the rear end is equipped with an opening through which a pivot shaft is inserted.

In one aspect of the present invention, the coil support portion has a small hole through which lead wires extending from a coil are inserted. The small hole formed in the coil support portion means a through hole formed with a diameter of a minimum dimension required for inserting naked lead wires or lead wires covered with insulating tubes therethrough. The configuration of the hole can be arbitrary selected if it has a minimum opening dimension required for inserting the lead wires therethrough. Therefore, the position of the small hole defines the wiring routes for the lead wires, and even if the space given to the wiring routes is narrow, the lead wires can be precisely wired in an allowed range. In addition, since the fixation by the small hole does not need to use an adhesive agent, there is no need to consider the emission of gas from an adhesive agent for fixation. After the lead wires from the coil have been inserted through the small hole, if the lead wires are processed in the following fabrication step, there will be no possibility that force will be applied to the boundary portion between the coil and the lead wire extending from the coil and the force will peel a wire of the coil off from the coil. In addition, in the disk storage being operated, there is no possibility that the lead wires extending from the coil will move and then touch other components.

In another aspect of the present invention, the aforementioned stacked type actuator arm assembly is used in a disk storage. The disk storage is not limited to a magnetic disk storage, but it is applicable to other disk storage equipped with the stacked type actuator arm assembly and using another data storage medium. Since the lead wires extending from the coil are fixed by the small hole, there is no possibility that they will be moved after operation of the disk storage. The present invention is particularly effective in a miniaturized disk storage in which there is not enough space for wiring the lead wires extending from the coil.

In still another aspect of the present invention, the lead wires extending from the coil are fixed at two places, thereby providing a disk storage equipped with a more reliable wiring structure. The lead wires inserted through the small hole are sandwiched between a connection board of a flexible cable and a circumferential portion of the spacer, and are fixed by the connection board. The spacer used for fixing the lead wires is not limited to the spacer equipped with the coil support portion.

The above as well as additional objects, features, and advantages of the present invention will become apparent in the following detailed written description.

DETAILED DESCRIPTION OF THE PREFERRED EMBODIMENT

This invention is described in a preferred embodiment in the following description with reference to the Figures, in which like numbers represent the same or similar elements. While the invention is described in terms of the best mode for achieving the invention's objectives, it will be appreciated by those skilled in the art that variations may be accomplished in view of these teachings without deviating from the spirit or scope of the invention.

Figure 4:
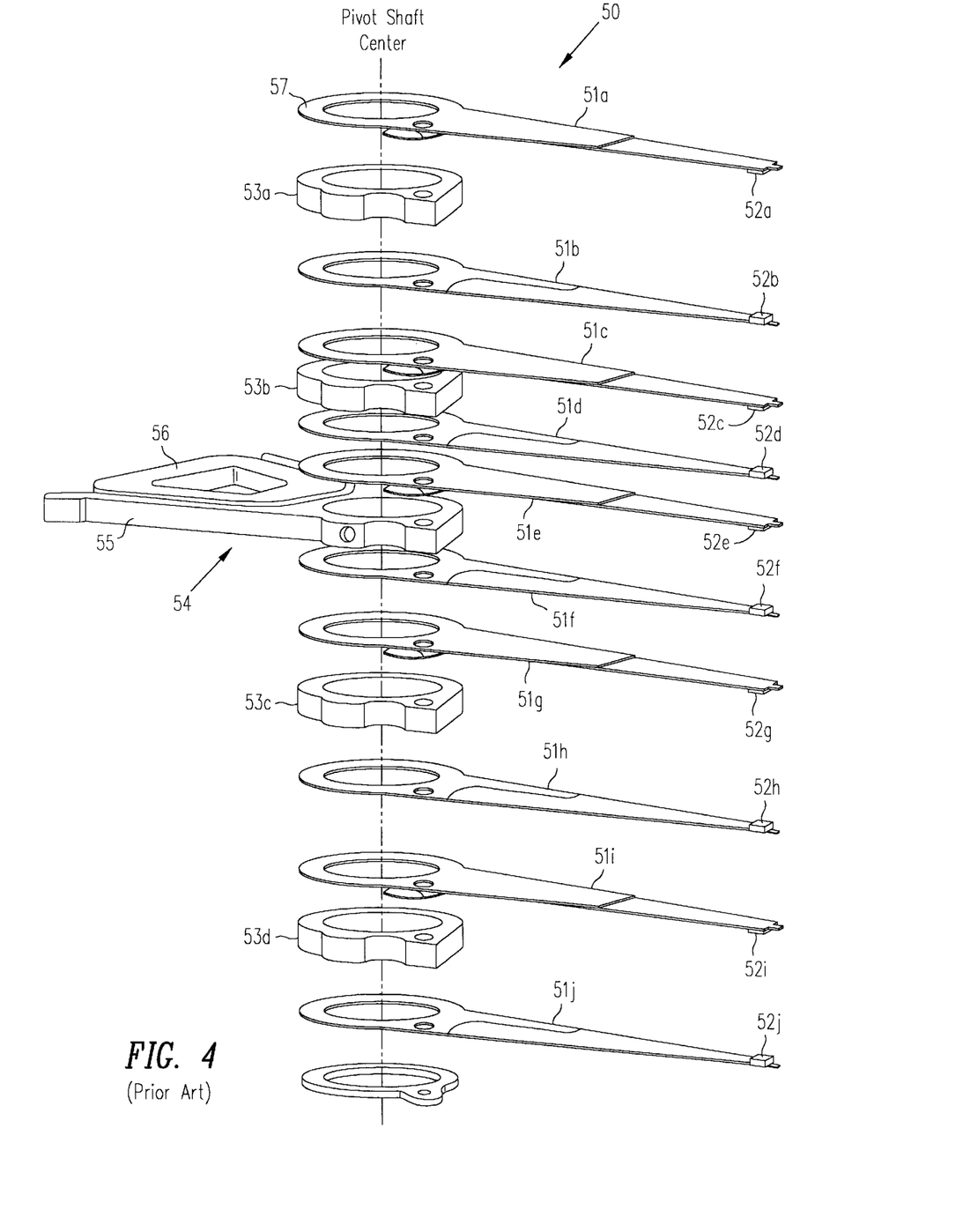
FIG. 4 is a perspective view showing a stacked type actuator arm assembly.

FIG. 4 is an assembly diagram showing an embodiment of a stacked type actuator arm assembly stacked with ten head/suspension assemblies 51, four spacers 53, and one coil support spacer 54. Accordingly, this actuator arm assembly corresponds to five magnetic disks. One head/suspension assembly 51 has a slider 52 attached to the point end portion thereof, and the rear end portion 57 is formed into a ring shape so that it can be inserted on a pivot shaft. The head/suspension assembly 51 is constituted by three portions: an actuator arm, a load beam, and a flexure, and each is formed with a thin stainless sheet. The three portions are joined together and united in a body by spot welding. The spacers 53 all have the same configuration and the thickness is determined in correspondence with the spacing between stacked magnetic disks. The coil support spacer 54 has the same thickness as the spacers 53 and is formed integrally with a coil support portion 55, and a coil 56 is fastened to the interior of the coil support portion 55 with an adhesive agent. The spacers 53 and coil support spacer 54 are formed into predetermined dimensions after stamping predetermined configurations from aluminum sheets and, in case of necessity, through machining such as cutting and polishing. In this machining, it requires a great number of steps and a great deal of cost to form a coil holder for fixation of lead wires on the spacer as in the conventional comb type actuator arm assembly.

Figure 5:
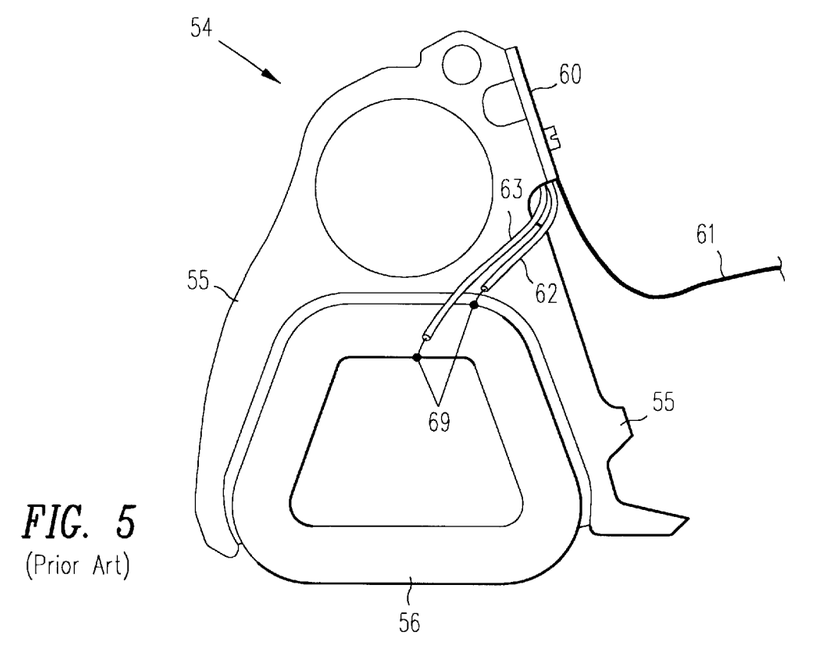
FIG. 5 is a plan view showing a spacer which does not fix lead wires.

FIG. 5 shows the state in which a connection board 60 for providing connection cites for both the lead wires (not shown) of a flexible cable 61 and magnetic heads and the lead wires 62 and 63 of the coil 56 has been attached to the coil support spacer 54, and in which the flexible cable 61 and the lead wires 62 and 63 of the coil 56 have been electrically connected with each other. In FIG. 5 the structure for fixing lead wires according to the present invention has not been shown yet. If it is assumed that the coil support spacer 54 is not provided with any lead wire holders, there is a need to wire the lead wires 62 and 63 to the connection board 60 in a range of a determined space on the coil support portion 55 so that they do not slacken, but it is not easy. When wiring is performed, there are cases where force is applied to boundary portions 69 between the coil 56 and the lead wire 62 and between the coil 56 and the lead wire 63 and peels a wire of the coil 56 off from the coil 56. Furthermore, if the lead wires 62 and 63 are not fixed, there is concern that the movement of the lead wires during operation of the magnetic disk storage or the stress applied to the lead wires will cause problems resulting in reduction in the reliability of the magnetic disk storage.

Figure 6A:
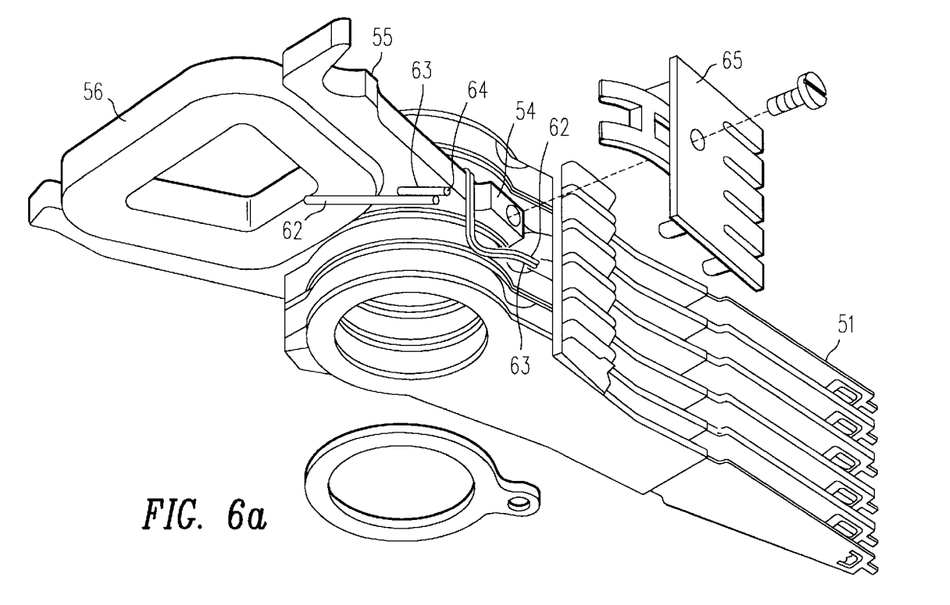
FIGS. 6a and 6b are below and above perspective views respectively, showing an embodiment of a stacked type actuator arm assembly equipped with a structure for fixing lead wires according to the present invention.
Figure 6B:
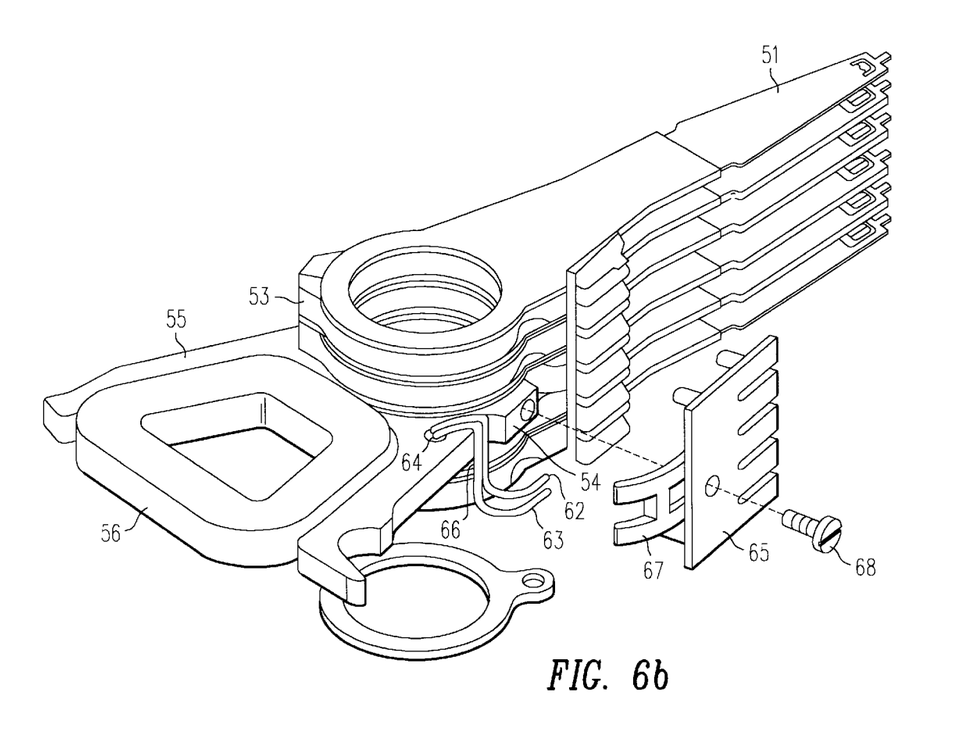

FIGS. 6(a) and 6(b) show an embodiment of a stacked type actuator arm assembly equipped with a structure for fixing lead wires according to the present invention. FIG. 6(a) is a perspective view as seen obliquely from below and FIG. 6(b) is a perspective view as seen obliquely from above. In this embodiment the coil support portion 55 has a small hole 64 extending therethrough based on the present invention. This small hole 64 can easily be formed concurrently when the contour of the coil support spacer 54 is stamped from a flat sheet. The lead wires 62 and 63 extend from the start end and terminal end of the wire of the coil 56 to the lower side of the coil support portion 55, and are covered with insulating tubes respectively for reinforcing the insulation of the lead wires. The insulating tube with the lead wire penetrates the small hole 64 from below to above. However, from the gist of the present invention the penetrating direction is not limited to a direction from below to above, but it may be the opposite direction. Besides the method of covering lead wires with insulating tubes, other insulation reinforcing methods can be adopted. A connection board 65 is coupled with a flexible cable (not shown), and on the connection board 65, the lead wires 62 and 63 and the flexible cable are electrically connected with each other. For the lead wires 62 and 63 penetrating the small hole 64, the wiring routes are defined at least at the position of the small hole 64, and furthermore, the frictional force between the inner wall of the small hole 64 and the insulating tube or the bent portion of the lead wire at the inlet of the small hole 64 resists the force applied in the longitudinal direction of the lead wire.

As a consequence, when wiring the lead wires 62 and 63 from the small hole 64 to the connection board 65 in the subsequent fabrication step, there is no possibility that force will be applied to the boundary portions 69 and will peel the wire of the coil 56 off. In addition, since the stacked type actuator arm assembly is suitable for fabricating thin type magnetic disk storage compared with the conventional comb type actuator arm assembly, concurrently the adoption of the stacked type actuator arm assembly considerably limits the space that each component can occupy within the housing of the magnetic disk storage, and also considerably limits the space that lead wires can occupy, as compared with the conventional comb type actuator arm assembly. In the circumstances such as this, the small hole 64 plays an important role in precisely wiring the lead wires 62 and 63 in a given space. In addition, the small hole 64 can hold the lead wires 62 and 63 at predetermined routes even during operation of the magnetic disk storage.

The position of the small hole 64 may be at any position on the coil support portion 55, but from the viewpoint of maintaining the rigidity of the spacers, a region where the area of a supporting portion is large is preferable. The inner diameter of the small hole 64 is desirable to be as small as possible from the viewpoint of holding effect for the lead wire and maintaining rigidity of the spacers, but it is desirable to be as large as possible from the viewpoint of the operability as the lead wires 62 and 63 are inserted through the small hole 64 in an assembly step. The inner diameter of the small hole 64, therefore, is determined by the balance between them. The small hole 64 preferably is selected so that the inner diameter is about double the outer diameter of the insulating tube. In this embodiment the outer diameter of the lead wire is selected to 0.19 mm, the outer diameter of the insulating tube to 0.5 mm, and the inner diameter of the small hole 64 to 1.3 mm. While this embodiment has been provided with a single small hole, from the gist of the present invention a method of inserting lead wires through a plurality of small holes up and down in sequence is not excluded.

Figure 7:
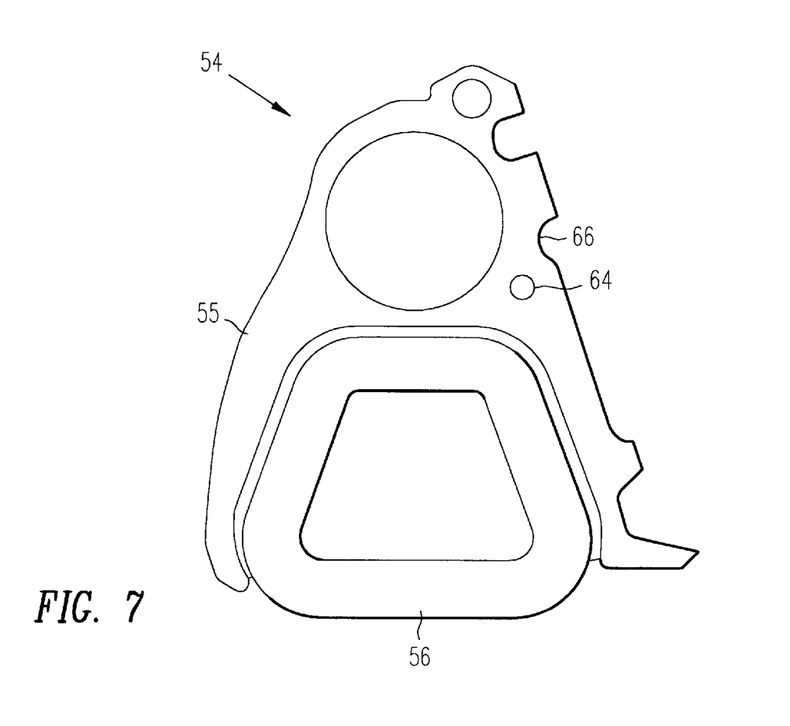
FIG. 7 is a plan view showing an embodiment of a spacer equipped with a structure for fixing lead wires according to the present invention.

FIG. 6(b) also shows another embodiment of the present invention. In this embodiment the lead wires 62 and 63 are fixed by simple structure, even in the wiring route from the position at which they penetrate the small hole 64 to the connection board 65. The lead wires 62 and 63 penetrating the small hole 64 are positioned at a positioning portion 66 formed in the coil support spacer 54 near the connection board 65 (FIG. 7). In FIG. 6 the connection board 65 is equipped with a cover portion 67 which covers a positioning portion 66 when attached to the spacer 54 with a screw 68. The connection board 65 and the cover portion 67 are integrally formed by a casting mold. If the connection board 65 is attached to the coil support spacer 54 after the lead wires 62 and 63 have been positioned at the positioning portion 66, the lead wires 62 and 63 can be sandwiched and fixed between the cover portion 67 and the positioning portion 66.

In a magnetic disk storage the comb type actuator arm assembly can be replaced with the stacked type actuator arm assembly. The structure for fixing the lead wires shown in the aforementioned embodiments, therefore, is applicable to a general magnetic disk storage such as the one shown in FIG. 1. If these two embodiments are combined together, the lead wires 62 and 63 between the coil 56 and the flexible cable 61 can be reliably fixed at two places by a simple structure with a reduction of fabrication steps and reduced cost, and consequently, a magnetic disk storage with high reliability can be provided.

The present invention is capable of providing a stacked type actuator arm assembly equipped with a structure for easily fixing lead wires between a coil and a flexible cable.

In addition, the present invention is capable of providing a disk storage mounted with a stacked type actuator arm assembly and equipped with a structure for easily fixing lead wires between a coil and a flexible cable.

While the present invention has been particularly shown and described with reference to the preferred embodiments, it will be appreciated by those skilled in the art that various changes in form and detail may be made without departing from the scope and teaching of the invention. Accordingly, the disclosed invention is to be considered merely as illustrative and limited in scope only as specified in the appended claims.

What is claimed is:

1. An actuator arm assembly comprising:
    a head/suspension assembly; and
    a spacer stacked with the head/suspension assembly, said spacer and said head/suspension assembly both having a coaxial aperture for accepting a pivot shaft;
    wherein said spacer has a coil support portion for holding a coil, said coil support portion having a preformed hole through which a lead wire extends from said coil.

2. The actuator arm assembly as set forth in claim 1, wherein said lead wire is covered with an insulating material where it extends through said hole.

3. The actuator arm assembly as set forth in claim 2, wherein the diameter of said hole is approximately twice the diameter of the insulated lead wire.

4. The actuator arm assembly as set forth in claim 1, wherein said coil support portion further comprises a positioning portion, wherein said lead is aligned in said positioning portion.

5. The actuator arm assembly as set forth in claim 4, wherein said positioning portion comprises a notch on a peripheral edge of said coil support portion.

6. The actuator arm assembly as set forth in claim 1, wherein said lead wire is bent at an inlet of said hole, thereby creating resistance to force applied to said lead wire in a longitudinal direction.

7. The actuator arm assembly as set forth in claim 1, wherein two or more lead wires extend from said coil, and said coil support portion has two or more holes extending therethrough, wherein at least one wire extends through each hole.

8. A disk storage comprising:

a disk;

a stacked type actuator arm assembly with a head and a coil attached thereto, the stacked actuator arm assembly being moved on the surface of said disk for positioning said head over a predetermined position on said disk;

a flexible cable connected at one end thereof to a lead wire extending from said coil; and a control unit connected to the other end of said flexible cable;

wherein said actuator arm assembly comprises a head/suspension assembly and a spacer stacked with the head suspension assembly, said head/suspension assembly and said spacer both having a coaxial aperture for accepting a pivot shaft, wherein said spacer has a coil support portion for holding a coil, said coil support portion having a preformed hole through which said lead wire extends from said coil.

9. The disk storage as set forth in claim 8, wherein said lead wire is covered with an insulating material where it extends through said hole.

10. The disk storage as set forth in claim 9, wherein the diameter of said hole is approximately twice the diameter of the insulated lead wire.

11. The disk storage as set forth in claim 8, wherein said coil support portion further comprises a positioning portion, wherein said lead is aligned in said positioning portion.

12. The disk storage as set forth in claim 11, wherein said positioning portion comprises a notch on a peripheral edge of said coil support portion.

13. The disk storage as set forth in claim 8, wherein said lead wire is bent at an inlet of said hole, thereby creating resistance to force applied to said lead wire in a longitudinal direction.

14. The disk storage as set forth in claim 8, wherein two or more lead wires extend from said coil, and said coil support portion has two or more holes extending therethrough, wherein at least one wire extends through each hole.

15. A disk storage comprising:

a disk;

a stacked type actuator arm assembly stacked with a head suspension assembly and a spacer, said head/suspension assembly and spacer both having a coaxial aperture for accepting a pivot shaft, said spacer having a coil support portion for holding said coil, said coil support portion having a preformed hole through which a lead wire extends from said coil, said stacked type actuator arm assembly being moved on the surface of said disk for positioning a head over a predetermined position on said disk;

a flexible cable connection board for sandwiching said lead wire between it and a circumferential portion of said spacer and fixing said lead wire located at said circumferential portion of said spacer;

a flexible cable having one end connected, on said flexible cable connection board, to said lead wire extending from said coil; and a control unit connected to the other end of said flexible cable.

16. The disk storage as set forth in claim 15, wherein said lead wire is covered with an insulating material where it extends through said hole.

17. The disk storage as set forth in claim 16, wherein the diameter of said hole is approximately twice the diameter of the insulated lead wire.

18. The disk storage as set forth in claim 15, wherein said coil support portion further comprises a positioning portion, wherein said lead is aligned in said positioning portion.

19. The disk storage as set forth in claim 18, wherein said positioning portion comprises a notch on a peripheral edge of said coil support portion.

20. The disk storage as set forth in claim 15, wherein said lead wire is bent at an inlet of said hole, thereby creating resistance to force applied to said lead wire in a longitudinal direction.

21. The disk storage as set forth in claim 15, wherein two or more lead wires extend from said coil, and said coil support portion has two or more holes extending therethrough, wherein at least one wire extends through each hole.

* * * * *